UNITED STATES PATENT OFFICE.

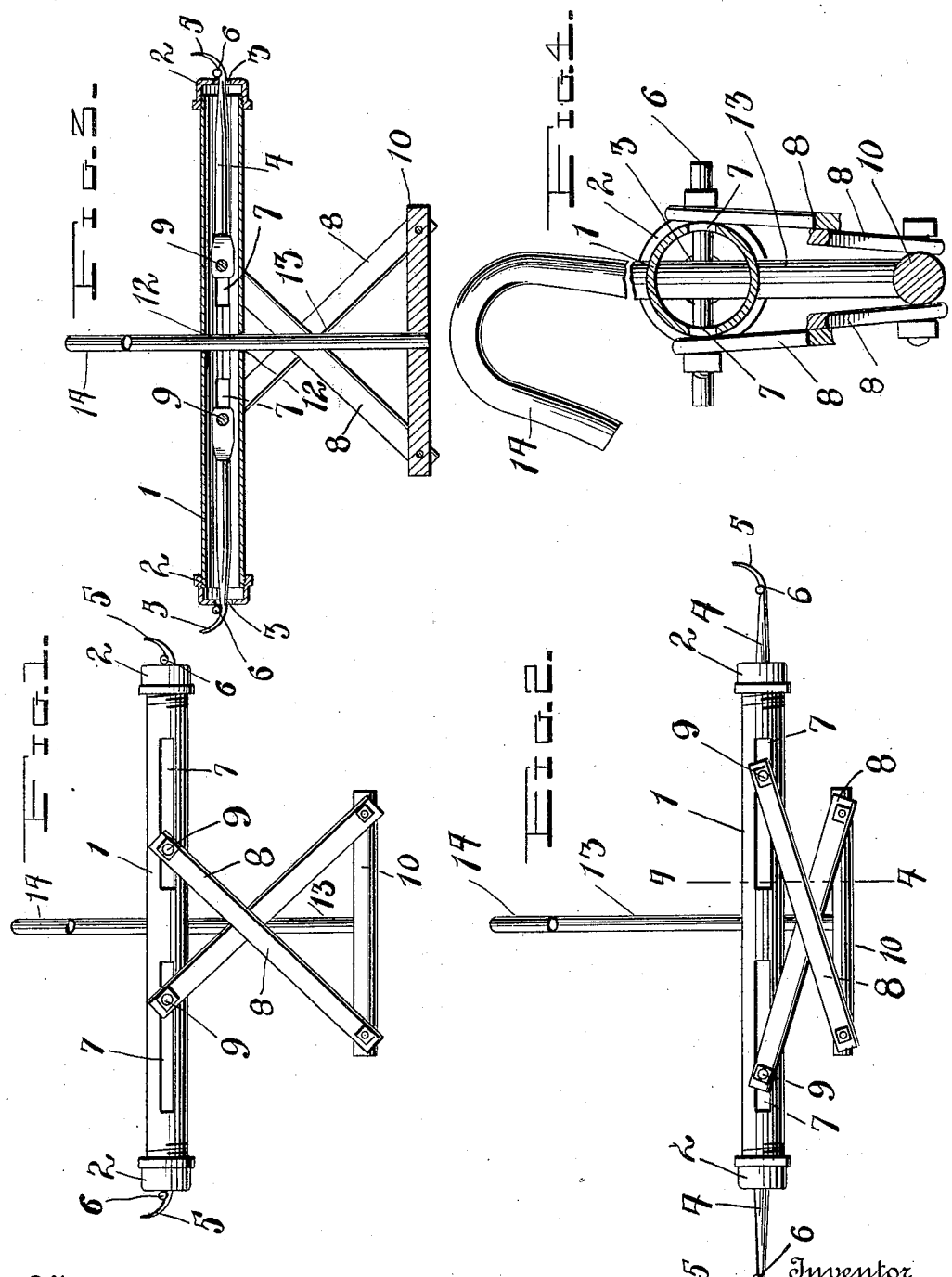

WILLIAM EDWARD VAN DER VEEN, OF HARVARD, ILLINOIS.

GAMBREL.

1,091,988.    Specification of Letters Patent.    Patented Mar. 31, 1914.

Application filed April 24, 1913.  Serial No. 763,435.

*To all whom it may concern:*

Be it known that I, WILLIAM EDWARD VAN DER VEEN, a citizen of the United States, residing at Harvard, in the county of McHenry, State of Illinois, have invented certain new and useful Improvements in Gambrels; and I do hereby declare the following to be a full, clear, and exact description of the invention, such as will enable others skilled in the art to which it appertains to make and use the same.

This invention is directed to improvements in gambrels, and has for its object to so construct a device of this character that the same can be easily and quickly engaged with a carcass.

A further object of the invention is to so construct a device of this character that the weight of the carcass will serve to distend the same for convenient dressing.

With these and other objects in view, this invention resides in the novel features of construction, formation, combination and arrangement of parts to be hereinafter more fully described, claimed and illustrated in the accompanying drawing, in which:—

Figure 1 is a front elevation of the device, showing the same in its inoperative position. Fig. 2 is a similar view, showing the same in its operative position. Fig. 3 is a longitudinal sectional view through the device. Fig. 4 is a sectional view on line 4—4 of Fig. 2.

Referring to the drawing, the numeral 1 designates a tubular body, having its ends closed by caps 2, which are provided with perforations 3 in which slide the arms 4, the outer ends of which are provided with pointed hooks 5 which are adapted to engage the legs of the carcass. To limit the penetrating action of the hooks 5 stops 6 are carried by the arms 4 and adjacent said hooks.

Formed in the body 1 are longitudinal slots 7, which are arranged in pairs and diametrically opposite.

Two pairs of links 8 are provided, the same being arranged in cross-wise relation and have their upper ends secured to bolts 9 which pass through the inner ends of the arms 4 and are adapted for sliding movement in the longitudinal slots 7. The lower ends of the links 8 are pivotally connected to the bar 10, and at the outer ends thereof, it being of course understood that the upper ends of said links are pivotally connected to the bolts 9.

Formed centrally in the tubular body 1 are vertically alined perforations 12, in which slides the shank 13, the lower end of which is fixed to the central portion of the bar 10, said shank having its upper end provided with a hook 14 for engagement with a suitable support.

From this construction it will be seen that when the device is in the position as shown in Fig. 1, that the hooks 5 can be readily engaged with the legs of the carcass, and when the device is suspended the weight of the carcass will tend to draw the tubular body 1 downwardly, whereupon the arms 4 will be forced outwardly, thus distending the carcass and preventing accidental displacement of the same.

What is claimed is:—

A gambrel comprising a tube, a bar parallel with said tube, a hook having the shank passed through said tube and slidably and rigidly connected to the center of said bar, a pair of crossed links on each side of said shank, each pair of crossed links having their crossing disposed in close proximity to said shank and substantially midway between said tube and said bar, pivotal connection between said links and said bar, a pair of hooks slidably fitted in the ends of said tube, pins passing through said hook and through slots in said tube, and pivotal connections between said links and said pins.

In testimony whereof, I affix my signature, in the presence of two witnesses.

WILLIAM EDWARD VAN DER VEEN.

Witnesses:
 GRACE WEITZEL,
 JAY E. JONES.

Copies of this patent may be obtained for five cents each, by addressing the "Commissioner of Patents, Washington, D. C."